United States Patent
LaHood

(10) Patent No.: US 9,315,971 B2
(45) Date of Patent: *Apr. 19, 2016

(54) RETAINER SYSTEMS FOR GROUND ENGAGING TOOLS

(71) Applicant: CATERPILLAR INC., Peoria, IL (US)

(72) Inventor: James Robert LaHood, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/839,459

(22) Filed: Mar. 15, 2013

(65) Prior Publication Data

US 2014/0259810 A1 Sep. 18, 2014

(51) Int. Cl.
*E02F 9/28* (2006.01)
*F16B 7/22* (2006.01)
*F16B 21/02* (2006.01)

(52) U.S. Cl.
CPC ............... *E02F 9/2841* (2013.01); *F16B 7/22* (2013.01); *F16B 21/02* (2013.01)

(58) Field of Classification Search
USPC .................................. 37/455, 456, 457, 458
IPC ........................................ E02F 9/2833,9/2841
See application file for complete search history.

(56) References Cited

U.S. PATENT DOCUMENTS

| | | | |
|---|---|---|---|
| 2,050,014 A | 8/1936 | Morrison | |
| 2,707,343 A | 5/1955 | Baer | |
| 5,666,748 A | 9/1997 | Emrich et al. | |
| 7,640,684 B2 | 1/2010 | Adamic et al. | |
| 7,681,341 B2* | 3/2010 | Ruvang | 37/456 |
| 7,730,651 B2* | 6/2010 | Carpenter | 37/452 |
| 7,762,015 B2* | 7/2010 | Smith et al. | 37/455 |
| 8,117,772 B2* | 2/2012 | Harder et al. | 37/455 |
| 8,122,622 B2* | 2/2012 | Smith et al. | 37/455 |
| 8,127,475 B2* | 3/2012 | Harder et al. | 37/452 |
| 8,356,432 B2* | 1/2013 | Carpenter | 37/452 |
| 8,393,097 B2* | 3/2013 | Harder et al. | 37/455 |
| 8,397,405 B2* | 3/2013 | Harder et al. | 37/455 |
| 8,770,311 B2* | 7/2014 | Rivera et al. | 172/699 |
| 8,925,221 B2* | 1/2015 | Jeske | E02F 9/2841 37/455 |
| 8,950,092 B2* | 2/2015 | Campomanes | E02F 9/2841 37/455 |
| 9,027,268 B2* | 5/2015 | Campomanes | E02F 9/2841 37/455 |
| 2002/0000053 A1 | 1/2002 | Adamic et al. | |
| 2013/0081833 A1* | 4/2013 | Rivera et al. | 172/713 |
| 2013/0081835 A1* | 4/2013 | Rivera et al. | 172/719 |
| 2014/0259807 A1* | 9/2014 | Jeske et al. | 37/455 |
| 2014/0259808 A1* | 9/2014 | LaHood et al. | 37/455 |
| 2014/0259811 A1* | 9/2014 | Ballinger | 37/455 |
| 2014/0259812 A1* | 9/2014 | Jeske | 37/458 |
| 2014/0259813 A1* | 9/2014 | Campomanes et al. | 37/458 |

* cited by examiner

*Primary Examiner* — Gary Hartmann
(74) *Attorney, Agent, or Firm* — Finnegan, Henderson, Farabow, Garrett & Dunner, LLP

(57) ABSTRACT

Disclosed are various exemplary embodiments of a retainer bushing for use with a lock of a ground engaging tool. The retainer bushing may include a skirt extending around a retainer axis, where the skirt may include an outer surface configured to mate with a lock cavity of the ground engaging tool and an inner surface configured to rotatably receive an outer surface of the lock. The retainer bushing may also include a detent projection extending radially inward from the inner surface and configured to engage a detent recess of the lock to resist rotation of the lock. The skirt and the detent projection may be integrally constructed of a thermoplastic material comprising polyoxymethylene.

15 Claims, 14 Drawing Sheets

RETAINER SYSTEMS FOR GROUND ENGAGING TOOLS

TECHNICAL FIELD

The present disclosure relates generally to ground engaging tools and, more particularly, to retainer systems for removably attaching the ground engaging tools to various earth-working machines.

BACKGROUND

Earth-working machines, such as, for example, excavators, wheel loaders, hydraulic mining shovels, cable shovels, bucket wheels, bulldozers, and draglines, are generally used for digging or ripping into the earth or rock and/or moving loosened work material from one place to another at a worksite. These earth-working machines include various earth-working implements, such as a bucket or a blade, for excavating or moving the work material. These implements can be subjected to extreme wear from the abrasion and impacts experienced during the earth-working applications.

To protect these implements against wear, and thereby prolong the useful life of the implements, various ground engaging tools, such as teeth, edge protectors, and other wear members, can be provided to the earth-working implements in the areas where the most damaging abrasions and impacts occur. These ground engaging tools are removably attached to the implements using customized retainer systems, so that worn or damaged ground engaging tools can be readily removed and replaced with new ground engaging tools.

Many retainer systems have been proposed and used for removably attaching various ground engaging tools to earth-working implements. One example of such retainer systems is disclosed in U.S. Pat. No. 7,640,684 to Adamic et al. The disclosed retainer system includes a releasable locking assembly for attaching a wear member to a support structure. The wear member includes at least one pin-retainer-receiving opening in one side. The opening is tapered, being narrower at its outer surface and wider at its inner surface. The support structure includes at least one pin receiving recess which generally aligns with the opening in the wear member when the wear member and the support structure are operatively coupled. A pin retainer that is frustoconically shaped and threaded internally is inserted into the opening in the wear member. The wear member is slidably mounted onto the support structure. The pin that is externally threaded is screwed into the pin retainer by the application of torque force from a standard ratchet tool. The pin extends through the wear member and into the recess in the support structure to lock the wear member to the support structure. The pin may be released using a ratchet tool and removed from the pin retainer. The wear member may then be removed from the support structure.

Another example of a retainer system for removably attaching various ground engaging tools to earth-working implements is disclosed in U.S. Pat. No. 7,762,015 to Smith et al. The retainer system includes a rotating lock having a slot for receiving a post of an adapter mounted to or part of a work tool. When the lock is rotated, the entrance to the slot is blocked and the post cannot slide out of the slot.

Many problems and/or disadvantages still exist with these known retainer systems. Various embodiments of the present disclosure may solve one or more of the problems and/or disadvantages.

SUMMARY

According to one exemplary aspect, the present disclosure is directed to a retainer bushing for use with a lock of a ground engaging tool. The retainer bushing may include a skirt extending around a retainer axis, where the skirt may include an outer surface configured to mate with a lock cavity of the ground engaging tool and an inner surface configured to rotatably receive an outer surface of the lock. The retainer bushing may also include a detent projection extending radially inward from the inner surface and configured to engage a detent recess of the lock to resist rotation of the lock. The skirt and the detent projection may be integrally constructed of a thermoplastic material comprising polyoxymethylene.

In another exemplary aspect of the present disclosure, a retainer bushing is disclosed for use with a lock to secure a ground engaging tool to a support member, where the lock includes an outer surface and the ground engaging tool includes a lock cavity. The retainer bushing may include a C-shaped body constructed of polyoxymethylene. The body may include an outer surface configured to mate with the lock cavity of the ground engaging tool, an inner surface configured to rotatably receive the outer surface of the lock, and a detent formed on the inner surface and configured to engage a detent of the lock to resist rotation of the lock.

In still another exemplary aspect of the present disclosure, a retainer system for a ground engaging tool may include a lock and a retainer bushing. The lock may include a head including a tool interface, a skirt extending from the head and including an outer surface, and a first detent formed on the outer surface of the skirt. The retainer bushing may include a C-shaped body constructed of polyoxymethylene. The retainer bushing may include an outer surface configured to mate with a lock cavity of the ground engaging tool, an inner surface configured to rotatably receive the outer surface of the lock, and a second detent formed on the inner surface of the retainer bushing and configured to engage the first detent of the lock.

DETAILED DESCRIPTION

Figure 1:
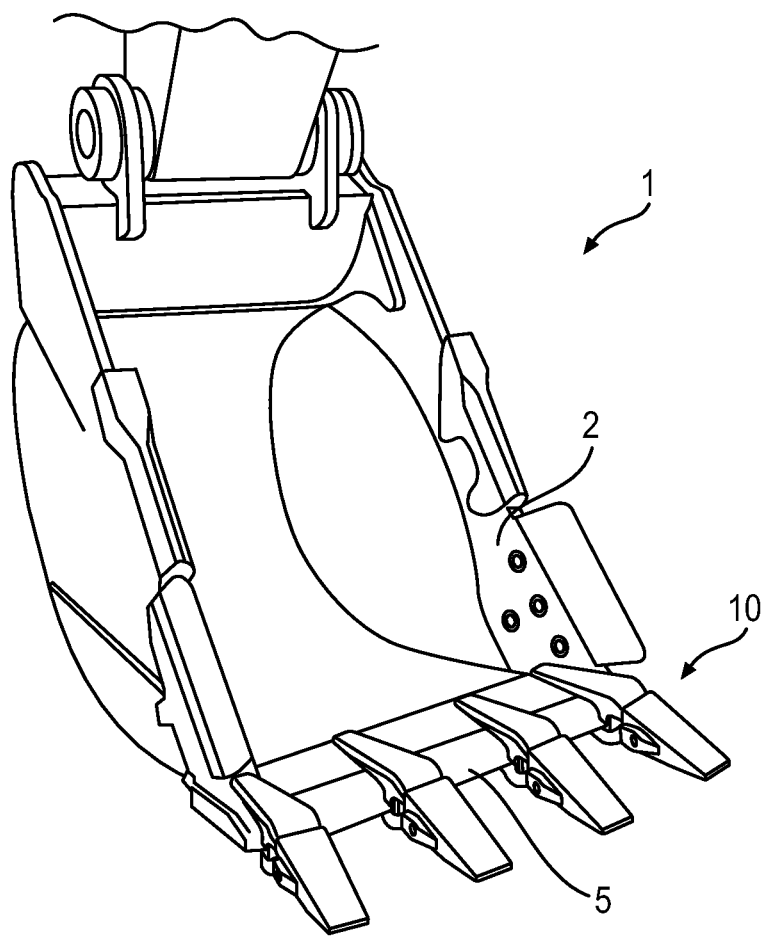
FIG. 1 is a perspective view of a loader bucket having a plurality of ground engaging tools attached thereto according to one exemplary embodiment of the present disclosure.

FIG. 1 illustrates an excavator bucket assembly 1 as an exemplary implement of an earth-working machine. Excavator bucket assembly 1 includes a bucket 2 used for excavating work material in a known manner. Bucket 2 may include a variety of ground engaging tools. For example, bucket 2 may include a plurality of tooth assemblies 10, as ground engaging tools, attached to a base edge 5 of bucket 2. Tooth assemblies 10 may be secured to bucket 2 employing retainer systems according to the present disclosure. While various embodiments of the present disclosure will be described in connection with a particular ground engaging tool (e.g., tooth assembly 10), it should be understood that the present disclosure may be applied to, or used in connection with, any other type of ground engaging tools or components. Further, it should be understood that one or more features described in connection with one embodiment can be implemented in any of the other disclosed embodiments unless otherwise specifically noted.

Figure 2:
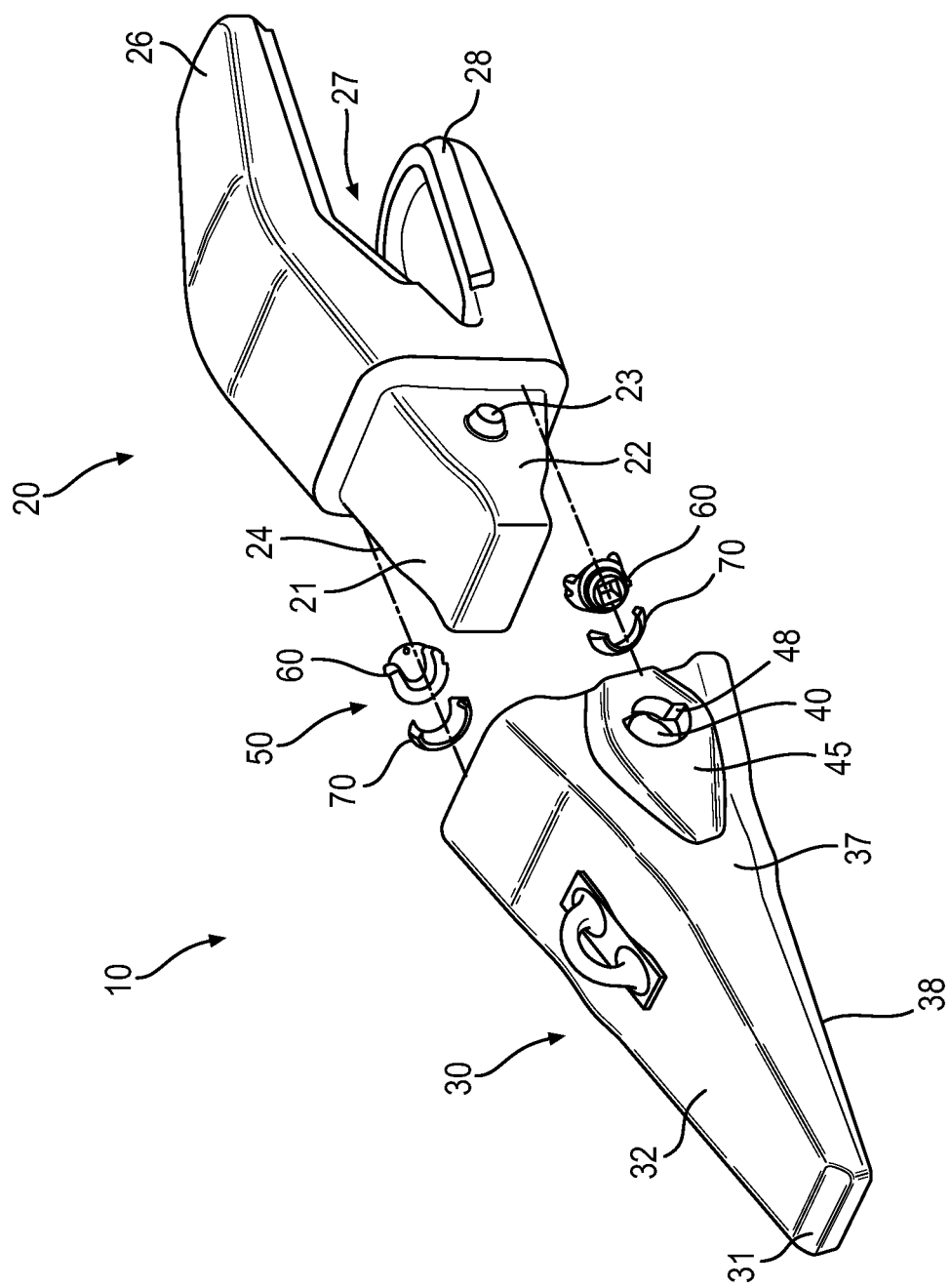
FIG. 2 is a perspective view of a tooth assembly according to one exemplary embodiment of the present disclosure.

Referring to FIG. 2, tooth assembly 10 may include an adapter 20 configured to engage base edge 5 of bucket 2 or other suitable support structure of an implement. Tooth assembly 10 may also include a ground-engaging tip 30 configured to be removably attached to adapter 20. Tooth assembly 10 may further include a retainer system 50 configured to secure tip 30 to adapter 20. Tip 30 endures the majority of the impact and abrasion caused by engagement with work material, and wears down more quickly and breaks more frequently than adapter 20. Consequently, multiple tips 30 may be attached to adapter 20, worn down, and replaced before adapter 20 itself needs to be replaced. As will be detailed herein, various exemplary embodiments of retainer system 50, consistent with the present disclosure, may facilitate attachment and detachment of ground engaging tools to and from support structure of an implement.

Adapter 20 may include a pair of first and second mounting legs 26, 28 defining a recess 27 therebetween for receiving base edge 5. Adapter 20 may be secured in place on base edge 5 by attaching first mounting leg 26 and second mounting leg 28 to base edge 5 using any suitable connection method. For example, mounting legs 26 and 28 and base edge 5 may have corresponding apertures (not shown) through which any suitable fasteners such as bolts or rivets may be inserted to hold adapter 20 in place. Alternatively or additionally, mounting legs 26 and 28 may be welded to the corresponding top and bottom surfaces of base edge 5. Any other connection method and/or configuration known in the art may be used alternatively or additionally. For example, in some exemplary embodiments, an adapter may be configured to use any of the retainer systems disclosed herein to secure the adapter to a suitable support structure of an implement.

Figure 3:
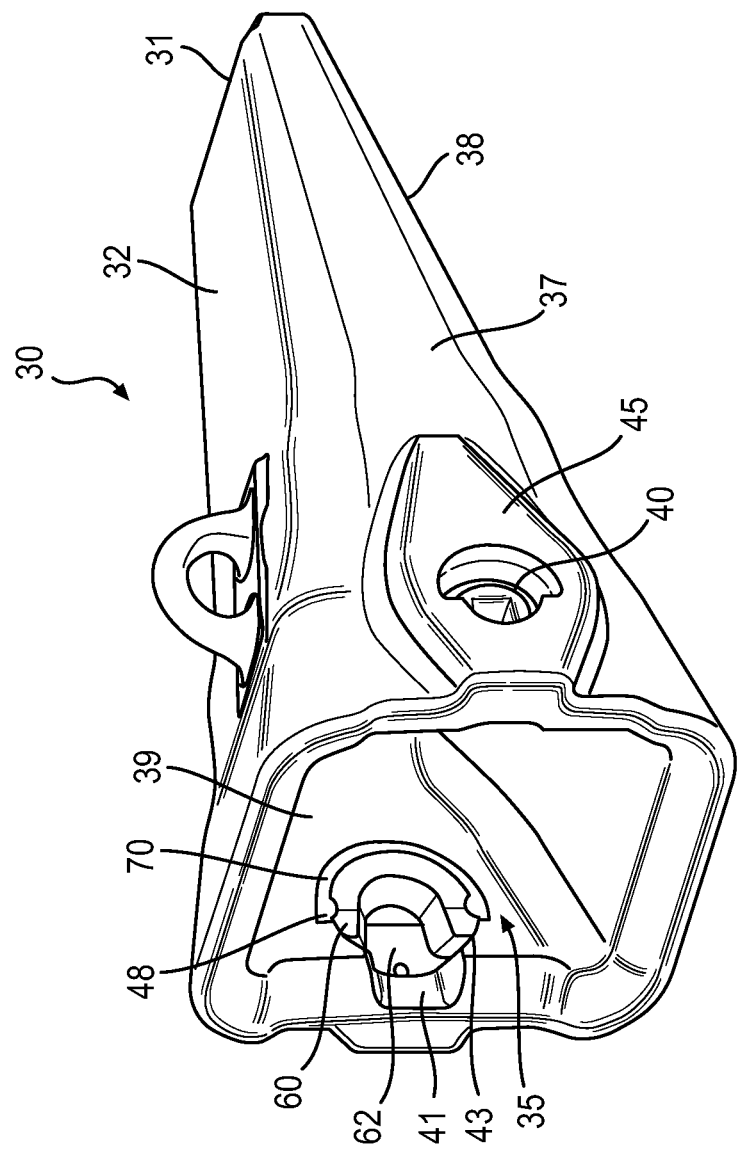
FIG. 3 is a perspective view of a tip of the tooth assembly shown in FIG. 2, with a lock and a retainer bushing positioned in a lock cavity of the tip.

Adapter 20 may include a nose 21 extending in a forward direction. As shown in FIG. 3, nose 21 may be configured to be received in a mounting cavity 35 of tip 30. Nose 21 may be configured to support tip 30 during use of bucket 2 and to facilitate retention of tip 30 on nose 21 when bearing the load of the work material. Nose 21 may include an integral post 23 extending from each lateral side 22, 24. Post 23 may have various shapes and sizes. In one exemplary embodiment, as shown in FIG. 2, post 23 may have a frustoconical shape. As will be described in more detail herein, posts 23 may cooperate with retainer system 50 to secure tip 30 to adapter 20.

As shown in the rear view of tip 30 in FIG. 3, tip 30 may define mounting cavity 35 inside tip 30 having a complementary configuration relative to nose 21 of adapter 20. Tip 30 may have various outer shapes. For example, as shown in FIG. 2, tip 30 may generally taper as it extends forward. For example, an upper surface 32 of tip 30 may slope downward as it extends forward, and a lower surface 38 of tip 30 may extend generally upward as it extends forward. Alternatively, lower surface 38 may extend generally straight or downward as it extends forward. At its forward end, tip 30 may have a wedge-shaped edge 31.

As mentioned above, tip 30 may be secured to adapter 20 via retainer system 50. Retainer system 50 may include a lock 60 and a retainer bushing 70. Tip 30 and/or adapter 20 may have various configurations for accommodating lock 60 and retainer bushing 70 therein. For example, in the exemplary embodiment shown in FIGS. 2 and 3, tip 30 may include a lock cavity 40 in each of its lateral sides 37 for housing lock 60 and retainer bushing 70. Lock 60 and retainer bushing 70 may be seated within lock cavity 40 when assembled to tip 30. Tip 30 may also include a lock bulge 45 extending outward of each lock cavity 40. While the exemplary embodiment shown in FIGS. 2 and 3 has lock cavity 40 and lock bulge 45 on each lateral side 37 of tip 30, tip 30 may have different numbers and/or arrangements of lock cavities 40 and lock bulges 45.

Figure 9:
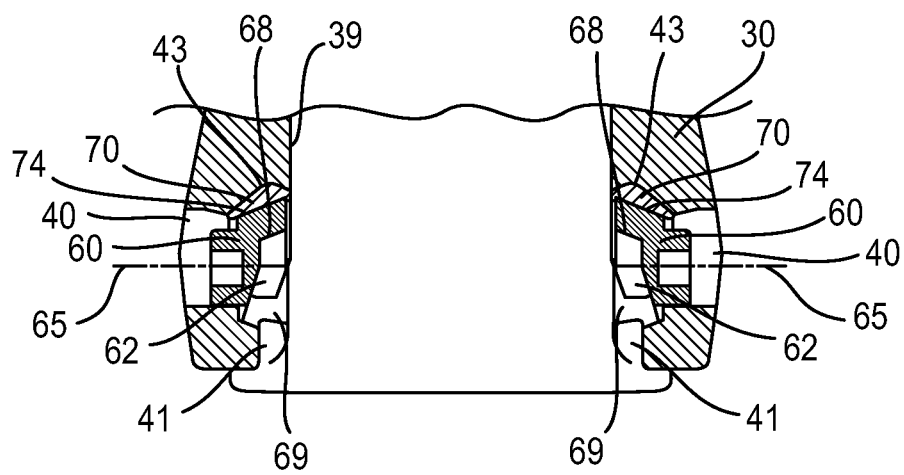
FIG. 9 is a cross-sectional view of the tip along plane IX-IX of FIG. 8, with the locks and retainer bushings positioned in lock cavities.

In one exemplary embodiment, lock 60 and retainer bushing 70 may be configured to seat within an inner surface 43 of lock cavity 40 in a manner allowing lock 60 to rotate at least partially around a lock rotation axis 65 (FIGS. 4, 5, and 9) relative to retainer bushing 70. As best shown in FIG. 9, retainer bushing 70 may seat directly against inner surface 43 of lock cavity 40, and lock 60 may seat against inner surface 74 of retainer bushing 70. On the rear side of lock cavity 40, lock cavity 40 may open into a side slot 41 that extends rearward from lock cavity 40 along inner surface 39 of lateral side 37. Side slot 41 may have a cross-section configured to allow passage of at least a portion of post 23 of adapter 20 being inserted from the rear end of tip 30.

Figure 6:
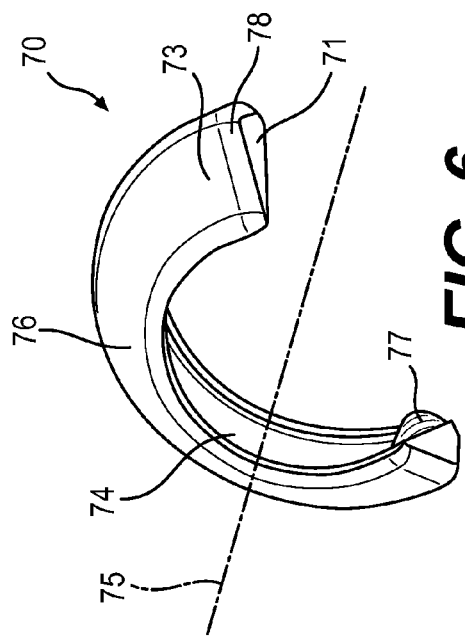
FIG. 6 is a perspective view of a retainer bushing according to one exemplary embodiment of the present disclosure.
Figure 7:
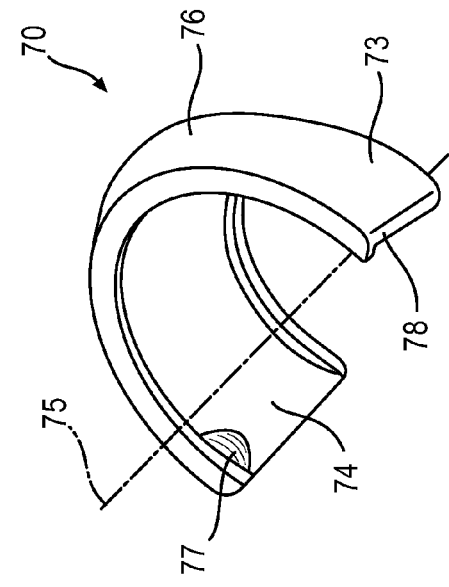
FIG. 7 is a perspective view from a bottom of the retainer bushing of FIG. 6.

Referring to FIGS. 6 and 7, retainer bushing 70 may include a C-shaped skirt 73 that extends around a retainer axis 75. Skirt 73 may extend only partway around retainer axis 75. In some exemplary embodiments, skirt 73 may extend approximately the same angular degree around retainer axis 75 as inner surface 43 of lock cavity 40 extends around lock rotation axis 65.

Figure 10:
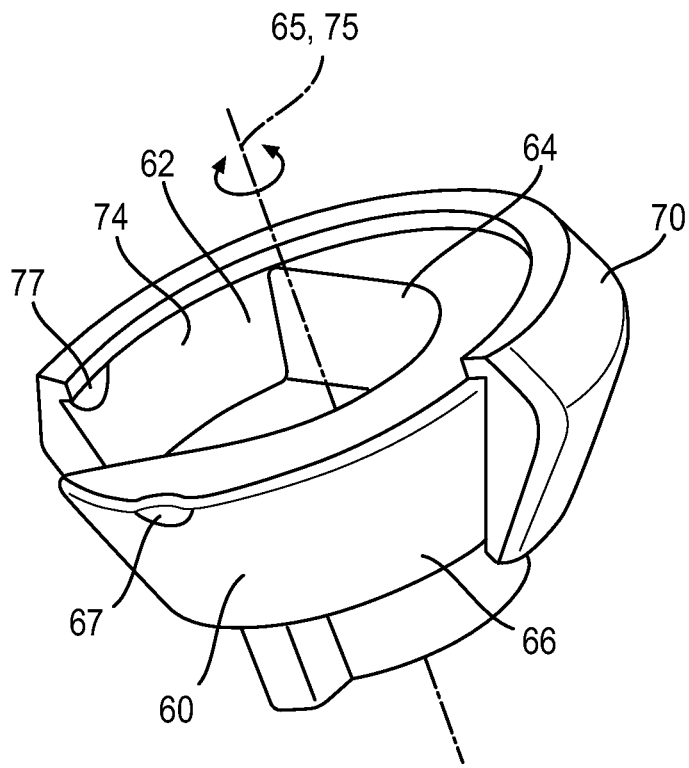
FIG. 10 is a perspective view illustrating a cooperative arrangement between the lock of FIGS. 4 and 5 and the retainer bushing of FIGS. 6 and 7.

Retainer bushing 70 may be configured to mate with inner surface 43 of lock cavity 40. For example, retainer bushing 70 may include an outer surface 76 with a frustoconical portion 71 configured to mate with a corresponding frustoconical portion of inner surface 43 in lock cavity 40. When retainer bushing 70 is disposed within lock cavity 40 with frustoconical portion 71 of outer surface 76 mated to the corresponding frustoconical portion of inner surface 43, retainer axis 75 may coincide with lock rotation axis 65 of lock 60, as shown in FIG. 10.

Lock cavity 40 may be configured such that, when retainer bushing 70 is seated in lock cavity 40, rotation of retainer bushing 70 with respect to lock rotation axis 65 is substantially prevented. For example, as best shown in FIG. 2, lock cavity 40 may include a shoulder 48 extending adjacent the circumferential outer ends of inner surface 43 and abutting the circumferential outer ends of skirt 73 of retainer bushing 70. Retainer bushing 70 may also include an inner surface 74 opposite outer surface 76 and extending circumferentially around and concentric with retainer axis 75. Accordingly, inner surface 74 may extend circumferentially around and concentric with lock rotation axis 65 when retainer bushing 70 is assembled with lock 60 in lock cavity 40.

In some exemplary embodiments, retainer bushing 70 may include one or more detents for engaging corresponding detents of lock 60. For example, as shown in FIGS. 6 and 7, retainer bushing 70 may include detent projections 77 extending radially inward from inner surface 74. Detent projections 77 may be located at various positions on retainer bushing 70. For example, detent projections 77 may be spaced approximately 180 degrees from one another around retainer axis 75. In one exemplary embodiment, a portion 78 of outer surface 76 in retainer bushing 70 that is directly opposite the location of detent projection 77 may have a smooth surface without any depression or surface discontinuity, as shown in FIGS. 6 and 7.

Figure 11:
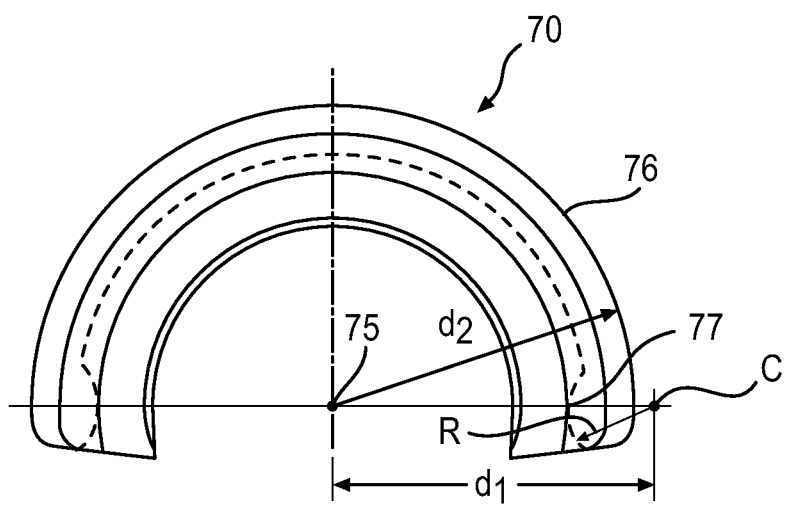
FIG. 11 is a top view of the retainer bushing of FIGS. 6 and 7, illustrating an exemplary geometrical configuration of detent projections.

Detent projections 77 may have various shapes. In one exemplary embodiment, each detent projection 77 may include a generally convex curved surface, such as a constant-radius surface, jutting radially outward from inner surface 74. The convex curved surface may decrease in size (e.g., radius) along a direction substantially parallel to retainer axis 75. As shown in FIG. 11, each of detent projections 77 may have a convex curved surface with a substantially constant radius R, whose center C is positioned at a distance $d_1$ from retainer axis 75 that is greater than a distance $d_2$ between retainer axis 75 and outer-most surface of retainer bushing 70. The dotted line in FIG. 11 depicts inner surface 74 of retainer bushing 70 at an elevation where radius R of detent projection 77 is at the greatest.

By way of example only, radius R may range from approximately 9.5 mm to approximately 14.2 mm. Distance $d_1$ may range from approximately 36.0 mm to approximately 53.7 mm. Distance $d_2$ may range from approximately 28.8 mm to approximately 43.0 mm. In one exemplary embodiment, distance $d_1$, distance $d_2$, and radius R may be approximately 53.7 mm, 43.0 mm, and 4.2 mm, respectively. Further, in some exemplary embodiments, the ratio of distance $d_1$ to distance $d_2$ may be approximately 1.25, and the ratio of distance $d_1$ to radius R may be approximately 3.8.

Figure 4:
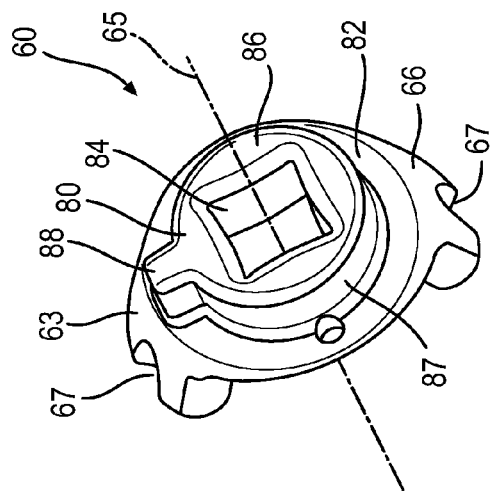
FIG. 4 is a perspective view of a lock of a retainer system according to one exemplary embodiment of the present disclosure.
Figure 5:
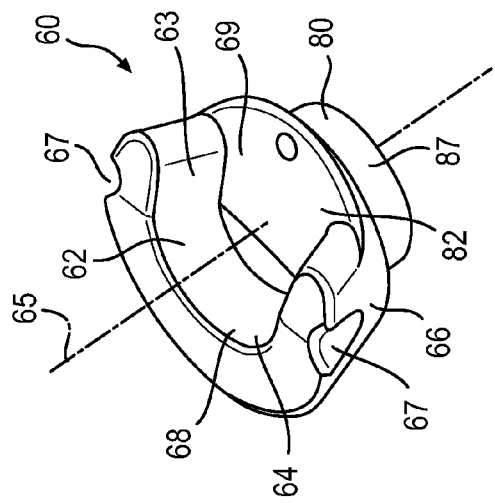
FIG. 5 is a perspective view from a bottom of the lock shown in FIG. 4.
Figure 8:
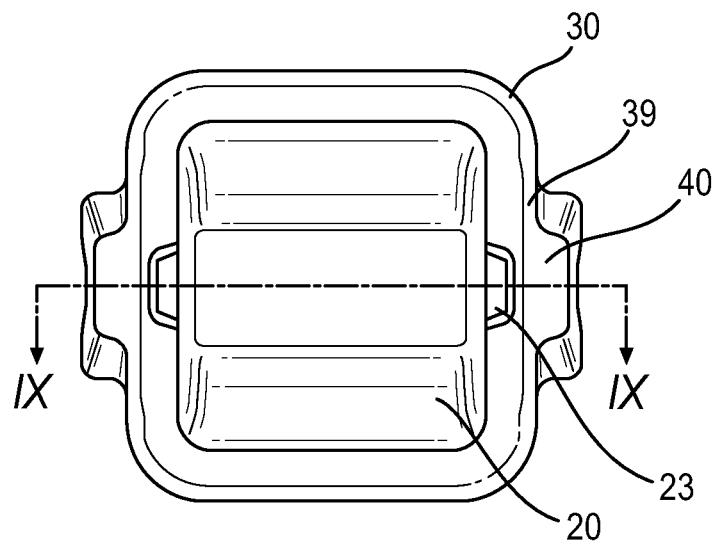
FIG. 8 is a rear view of the tip of FIG. 3, illustrating a mounting cavity for receiving the corresponding adapter shown in FIG. 2.

As mentioned above, lock 60 may be configured to mate with inner surface 74 of retainer bushing 70. For example, as best shown in FIGS. 4 and 5, lock 60 may include a skirt 63 with an outer surface 66 having a substantially the same profile as inner surface 74 of retainer bushing 70. Outer surface 66 of skirt 63 may be concentric with and extend circumferentially around lock rotation axis 65. Skirt 63 and outer surface 66 may extend only partway around lock rotation axis 65. For example, skirt 63 and outer surface 66 may extend around lock rotation axis 65 substantially the same angular degree that skirt 73 of retainer bushing 70 extends around retainer axis 75. With skirt 63 and outer surface 66 of lock 60 so configured, lock 60 may be seated within retainer bushing 70 with outer surface 66 of lock 60 mated to inner surface 74 of retainer bushing 70. When lock 60 is so positioned within retainer bushing 70, lock rotation axis 65 may coincide with retainer axis 75.

Lock 60 may include one or more detent recesses 67 configured to engage corresponding detent projections 77 of retainer bushing 70 to releasably hold lock 60 in predetermined rotational positions about lock rotation axis 65. For example, as shown in FIGS. 4 and 5, detent recess 67 of lock 60 may extend radially inward from outer surface 66 of skirt 63. Detent recesses 67 may have a shape configured to mate with detent projections 77. In the embodiment shown in FIGS. 4 and 5, detent recesses 67 may include a concave surface, such as a constant-radius curved surface, extending radially inward from outer surface 66. In some embodiments, detent recesses 67 may be spaced approximately the same distance from one another as detent projections 77. Thus, where detent projections 77 are spaced approximately 180 degrees from one another, detent recesses 67 may likewise be spaced approximately 180 degrees from one another. Accordingly, lock 60 may be positioned in retainer bushing 70 with outer surface 66 seated against inner surface 74 of retainer bushing 70 and detent projections 77 extending into detent recesses 67. In an alternative embodiment, as will be described in more detail later with reference to FIGS. 21-24, lock 560 may include only one detent recess 567 while retainer bushing 570 may include two detent projections 577 and 579.

Retainer bushing 70 may be configured to deflect so as to allow detent projections 77 to engage and/or disengage detent recesses 67 of lock 60. For example, retainer bushing 70 may be constructed at least partially of a flexible material, including but not limited to, a plastic material or an elastomeric material. In some embodiments, retainer bushing 70 may be constructed wholly of such a flexible material.

According to one exemplary embodiment, retainer bushing 70 may be constructed of self-lubricating material that may either exude or shed lubricating substance. For example, retainer bushing 70 may be made of thermoplastic material comprising polyoxymethylene (POM), also known as Delrin®. Retainer bushing 70 made of such material may exhibit low friction while maintaining dimensional stability.

Lock 60 may be constructed of metal. Alternatively or additionally, all or a portion of the surface of lock 60 may be coated with a friction-reducing material. The term "friction-reducing material," as used herein, refers to a material that renders the surface of lock 60 to have a friction coefficient ranging from approximately 0.16 to approximately 0.7. For example, at least a portion of the surface of lock 60 may be plated with zinc to reduce friction on the surface of lock 60 (e.g., surface between lock 60 and retainer bushing 70) to a friction coefficient between approximately 0.16 to approximately 0.7.

In another exemplary embodiment, at least a portion of the surface of lock 60 may be coated with graphite powder. The graphite powder may be aerosolized and sprayed directly onto the surface of lock 60. Alternatively or additionally, the graphite powder may be mixed with a suitable solvent material and applied to the surface of lock 60 by using a brush or dipping the lock 60 into the mixture. In one exemplary embodiment, a commercially available graphite lubricant, such as the products sold under trademark SLIP Plate, may be used alternatively or additionally.

Lock 60 may be configured to receive at least part of post 23 of adapter 20. For example, as best shown in FIGS. 3, 5, and 9, lock 60 may include a lock slot 62 extending into skirt 63. Lock slot 62 may have an open end 69 between two circumferential ends of skirt 63 and a closed end 68 adjacent a middle portion of skirt 63. In some embodiments, lock slot 62 may have a size and shape such that it can receive frustoconical post 23 of adapter 20. The inner surface 64 of skirt 63 may be sloped so as to mate with frustoconical post 23 of adapter 20 adjacent closed end 68 of lock slot 62.

Lock 60 may also include a head portion 80 attached to skirt 63 adjacent the narrow end of skirt 63. As best shown in FIGS. 4 and 5, head portion 80 may include a wall 82 extending in a plane substantially perpendicular to lock rotation axis 65 and across the narrow end of skirt 63. In some embodiments, wall 82 may fully enclose the side of lock slot 62 adjacent the narrow end of skirt 63. The side of head portion 80 opposite lock slot 62 may include a projection 86 extending from wall 82 away from skirt 63 along lock rotation axis 65. Projection 86 may include a substantially cylindrical outer surface 87 extending around most of lock rotation axis 65 and a tab 88 extending radially outward relative to lock rotation axis 65. In some exemplary embodiments, tab 88 may extend transverse relative to the direction that lock slot 62 extends from open end 69 to closed end 68.

As mentioned above, lock 60 may be installed with retainer bushing 70 in lock cavity 40 with outer surface 66 of lock 60 mated to inner surface 74 of retainer bushing 70 and detent recesses 67 of lock 60 mated to detent projections 77 of retainer bushing 70. When lock 60 is disposed in this position, open end 69 of lock slot 62 may face rearward, as shown in FIGS. 3 and 9. This position allows sliding insertion and removal of post 23 into and out of lock slot 62 through open end 69. Accordingly, this position of lock 60 may be considered an unlocked position.

To lock post 23 inside lock slot 62, lock 60 may be rotated with respect to lock rotation axis 65 to a locked position. In this locked position, the portion of lock skirt 63 adjacent closed end 68 may preclude sliding movement of post 23 relative to lock slot 62, thereby preventing sliding movement of tip 30 relative to adapter 20. The locked position of lock 60 may be approximately 180 degrees from the unlocked position about lock rotation axis 65. In the locked position, as in the unlocked position, detent recesses 67 of lock 60 may engage detent projections 77 of retainer bushing 70, which may releasably hold lock 60 in the locked position.

To rotate lock 60 between the unlocked position and the locked position, sufficient torque may be applied to lock 60 with respect to lock rotation axis 65 to cause detent projections 77 and/or detent recesses 67 to deflect and disengage from one another. Once detent projections 77 and detent recesses 67 are disengaged from one another, outer surface 66 of skirt 63 of lock 60 may slide along inner surface 74 of retainer bushing 70 as lock 60 rotates around lock rotation axis 65. Once lock 60 rotates approximately 180 degrees around lock rotation axis 65, detent projections 77 and detent recesses 67 may reengage one another to releasably hold lock 60 in that rotational position.

Lock 60 may also include a tool interface 84 in head portion 80 to facilitate rotating lock 60 about lock rotation axis 65. Tool interface 84 may include any type of features configured to be engaged by a tool for applying torque to lock 60 about lock rotation axis 65. For example, as shown in FIG. 4, tool interface 84 may include a socket recess with a cross-section configured to engage a socket driver, such as a socket wrench. When lock 60 is seated within lock cavity 40, head portion 80 defining tool interface 84 may extend at least partially through lock cavity 40 and lock bulges 45, and lock cavity 40 may provide an access opening for a tool to engage tool interface 84.

Ground engaging tools and the associated retainer systems of the present disclosure are not limited to the exemplary configurations described above. For example, ground engaging tool 10 may include a different number of lock cavities 40, and ground engaging tool 10 may employ a different number and configuration of posts 23, locks 60, and retainer bushings 70. Additionally, in lieu of adapter 20 and posts 23, ground engaging tool 10 may employ one or more pins fixed to or integrally formed with suitable support structure.

Certain exemplary aspects of the present disclosure may provide various alternative and/or additional configurations of retainer systems for removably attaching ground engaging tools to suitable support structure of an implement. For example, further modifications to a lock and/or a retention bushing of a retainer system may be possible to improve the performance of the retention system. In the following descriptions, various embodiments of the retainer system that may reduce friction caused by work material around the retainer system during rotation of the lock are disclosed.

It should be noted that, in the description of the following embodiments, only the features that are different from the above-described embodiments are highlighted, and the detailed description of the features that are common to the above-described embodiments are omitted herein.

Figure 13:
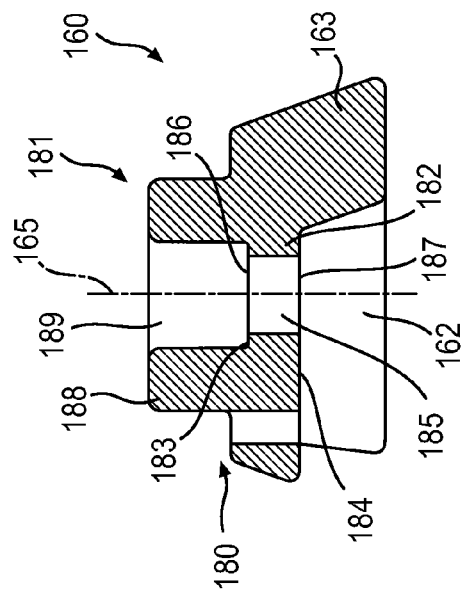
FIG. 13 is a cross-sectional view along plane XIII-XIII of the lock shown in FIG. 12.
Figure 14:
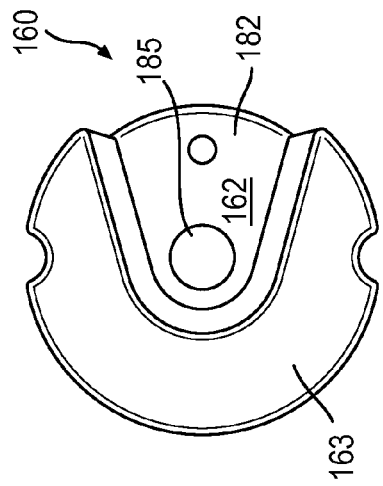
FIG. 14 is a bottom view of the lock shown in FIG. 12.
Figure 12:
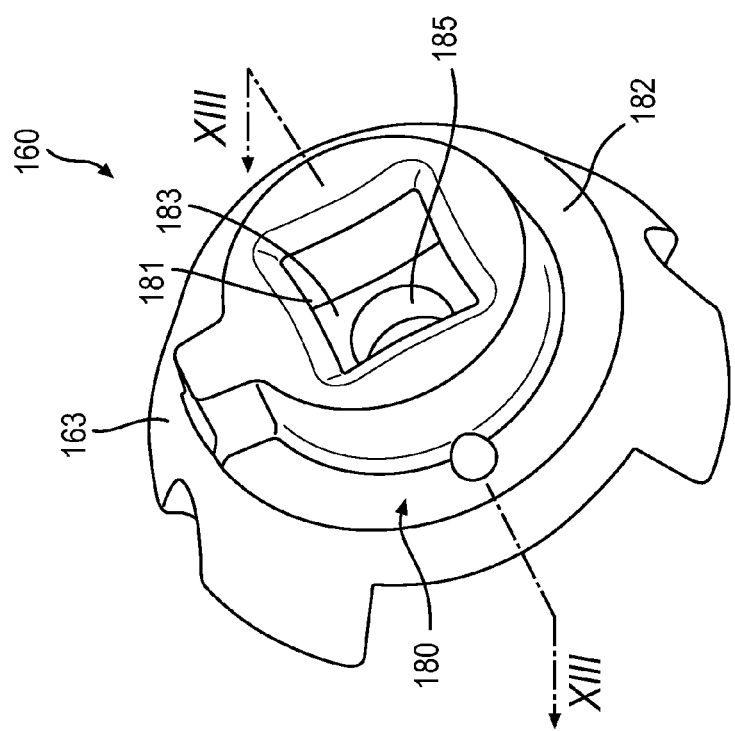
FIG. 12 is a perspective view of a lock according to another exemplary embodiment of the present disclosure.

FIGS. 12-14 illustrate a lock 160 of a retainer system according to one exemplary embodiment. Lock 160 may include a head portion 180 having a tool interface 181 extending along a lock rotation axis 165 and a C-shaped skirt 163 extended from head portion 180. Lock 160 may also include a wall 182 extending in a plane substantially perpendicular to lock rotation axis 165. As best shown in FIG. 13, wall 182 includes a first surface 183 from which tool interface 181 extends along lock rotation axis 165 and a second surface 184, opposite from first surface 183, from which skirt 163 extends at an angle. Tool interface 181 may include a projection 188 extending from wall 182 with a substantially cylindrical outer surface and a socket recess 189 defined inside projection 188, where socket recess 189 is configured to receive a socket driver (e.g., a socket wrench) for applying torque to lock 160 about lock rotation axis 165.

Wall 182 may include a through-hole 185 having a first end 186 opening out to socket recess 189 of tool interface 181 and a second end 187 opening out to lock slot 162 defined by skirt 163. Through-hole 185 thus formed may serve as an escape hole for packed work material to escape from lock slot 62. Although through-hole 185 has a circular shape in the disclosed embodiment, through-hole 185 may have any other shape and/or size. For example, through-hole 180 may have a rectangular shape and/or a size substantially equal to the opening area of tool interface 181. In an alternate embodiment, instead of providing projection 188 for defining tool interface 181, through-hole 185 may define and serve as a tool interface.

With through-hole 185 in lock 160, work material that may enter, accumulate, and/or become hardened inside lock slot 162 may escape through through-hole 185 and make it easier for an operator to rotate lock 160 relative to a retainer bushing and/or a support member in contact with lock 160.

Figure 17:
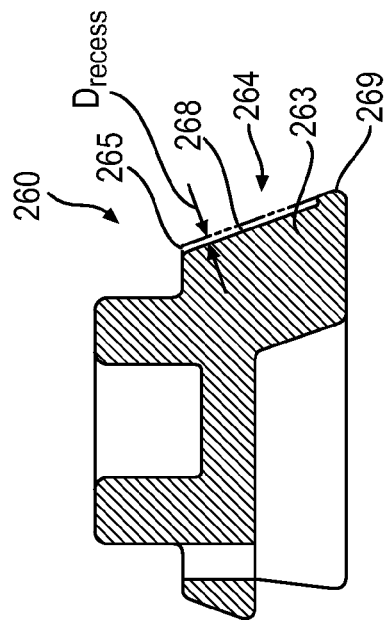
FIG. 17 is a cross-sectional side view along plain XVII-XVII of the lock shown in FIG. 15.
Figure 16:
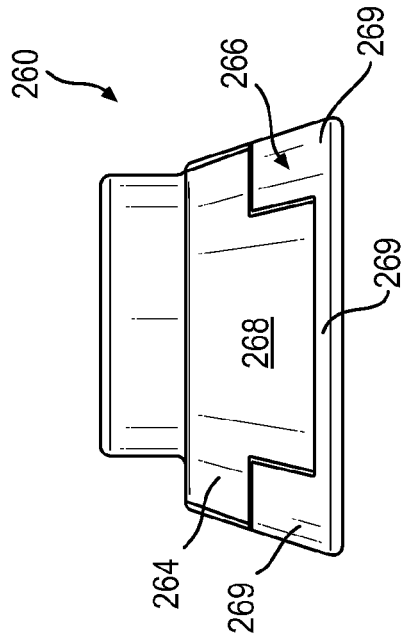
FIG. 16 is a side view from the direction of the arrow of the lock shown in FIG. 15.
Figure 15:
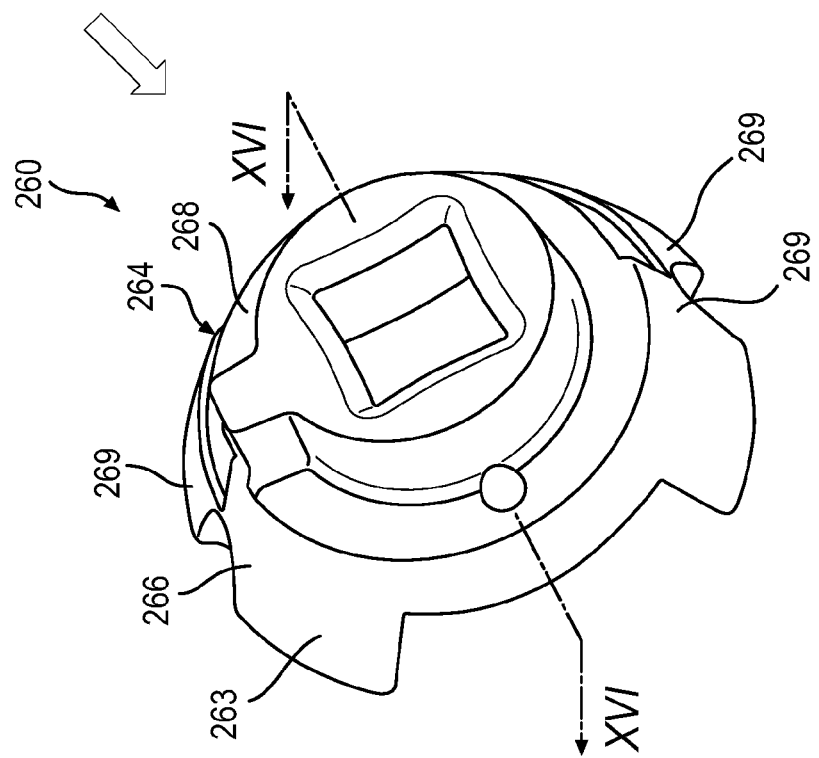
FIG. 15 is a perspective view of a lock according to still another exemplary embodiment of the present disclosure.

According to another exemplary embodiment, an outer surface of a skirt in a lock, which is configured to contact an inner surface of a retainer bushing, may include a recessed portion. For example, as shown in FIGS. 15-17, lock 260 may include a C-shaped skirt 263 attached to a head portion. Skirt 263 includes an outer surface 266 configured to be rotatably received in an inner surface of a retainer bushing (e.g., inner surface 74 of retainer bushing 70 shown in FIGS. 6 and 7). Outer surface 266 may include a recessed portion 264 configured to create a gap 265 between inner surface 74 of retainer bushing 70 and a base surface 268 of recessed portion 264 when outer surface 266 of skirt 263 is rotatably received in inner surface 74 of retainer bushing 70.

Portions 269 of outer surface 266 that do not include recessed portion 264 may be configured to contact inner surface 74 of retainer bushing 70 without affecting relative rotational movement between skirt 263 and retainer bushing 70 and without interfering with gap 265 created by recessed portion 264. Recessed portion 264 may have any shape and/or size. For example, while recessed portion 264 shown in FIG. 16 has a generally T-shape, recessed portion 264 may have a generally rectangular, trapezoidal, or circular shape formed around a portion of outer surface 266. In some exemplary embodiments, recessed portion 264 may have a plurality of recessed portions 264.

By way of example only, recessed portion 264 may have a depth $D_{recess}$ (i.e., distance between outer surface 266 at portions 269 and base surface 268 of recessed portion 264) of approximately 0.12 to 0.2 times the thickness of skirt 263. In some exemplary embodiments, depth $D_{recess}$ may range between approximately 1.0 mm to approximately 1.7 mm. In one exemplary embodiment, recessed portion 264 has depth $D_{recess}$ of approximately 1.2 mm.

With skirt 263 provided with one or more recessed portions 264, any work material that may enter into a space between inner surface 74 of retainer bushing 70 and outer surface 266 of lock 260 may freely move within gap 265 formed between recessed portion 264 and inner surface 74 of retainer bushing 70. As a result, potentially adverse effects (e.g., increased friction between lock 260 and retainer bushing 70) caused by work material between outer surface 266 of lock 260 and inner surface 74 of retainer bushing 70 can be reduced or eliminated.

Figure 18:
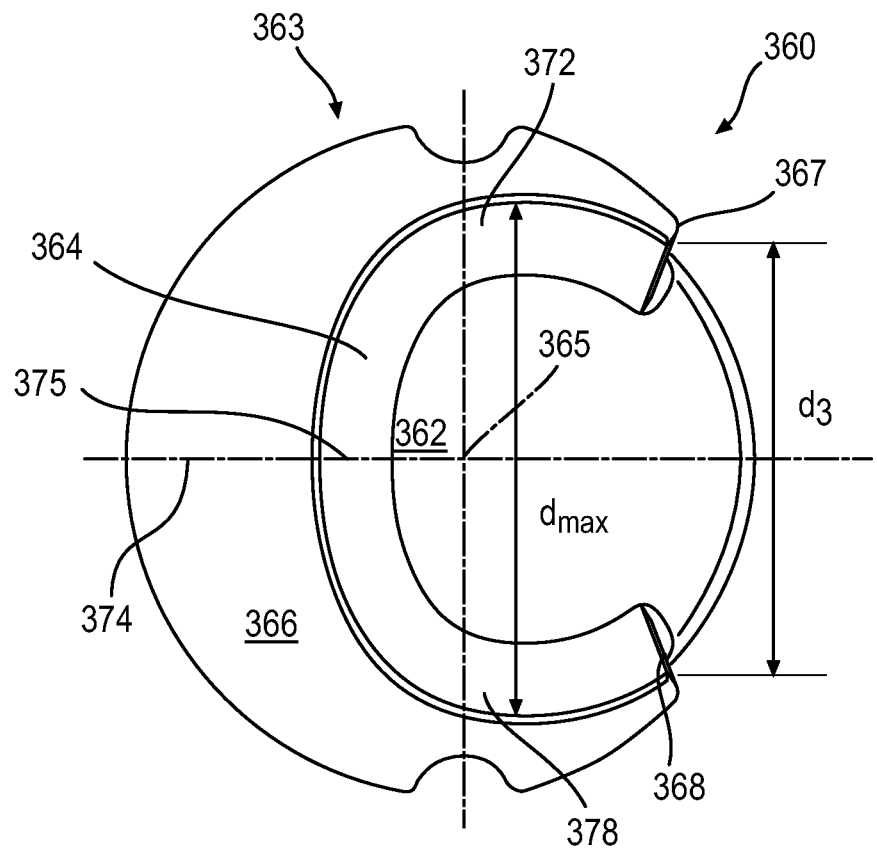
FIG. 18 is a bottom view of a lock according to another exemplary embodiment of the present disclosure.

In accordance with still another exemplary embodiment of the present disclosure, FIG. 18 illustrates a configuration of a skirt 363 of a lock 360, which may facilitate accommodation of a worn post 23 in a lock slot 362 of skirt 363. For example, lock 360 includes C-shaped skirt 363 having an outer surface configured to be rotatably received in an inner surface of a retainer bushing and an inner surface 364 defining a lock slot 362 configured to receive a support member (e.g., post 23 of adapter 20 shown in FIG. 2) to be locked with a ground engaging tool. Inner surface 364 may extend between a first circumferential end 367 and a second circumferential end 368 to define lock slot 362. Inner surface 364 may be sloped at an angle corresponding to a frustoconical portion of a support member (e.g., post 23).

For description purposes, inner surface 364 may be divided into a first inner surface 372 and a second inner surface 378. First inner surface 372 extends between first circumferential end 367 and a midpoint 375 between first circumferential end 367 and second circumferential end 368. Second inner surface 378 extends between second circumferential end 368 and midpoint 375. As shown in FIG. 18, first inner surface 372 and second inner surface 378 may be symmetrical with respect to a first plane 374 that is substantially parallel to lock rotation axis 365 and passing through midpoint 375. In an alternative embodiment, first inner surface 372 and second inner surface 378 may not be in a symmetry with one another.

First inner surface 372 and second inner surface 378 may be configured such that, on a given horizontal plane extending substantially perpendicular to lock rotation axis 365, a distance $d_3$ between first circumferential end 367 and second circumferential end 368 is less than a maximum distance $d_{max}$ between first inner surface 372 and second inner surface 378, where distances $d_3$ and $d_{max}$ are measured in a direction perpendicular to first plane 374.

By way of example only, maximum distance $d_{max}$ at a plane containing base 366 may range from approximately 60 mm and 64 mm, and distance $d_3$ may range from approximately 50 mm to approximately 54 mm. The ratio of distance $d_3$ to maximum distance $d_{max}$ may range from approximately 0.83 to approximately 0.84.

When post 23 of adapter 20 is worn, post 23 may be displaced from a normal center location. With the disclosed configuration of skirt 363 that defines lock slot 362, either or both of circumferential ends 367 and 368 may serve as a hooking member for grasping worn post 23 and guiding it into lock slot 362.

Figure 19:
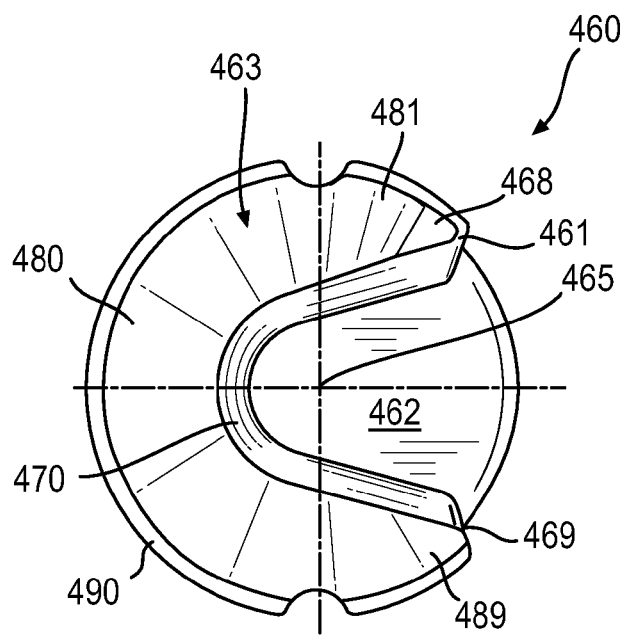
FIG. 19 is a bottom view of a lock having a helical bottom surface according to another exemplary embodiment of the present disclosure.
Figure 20:
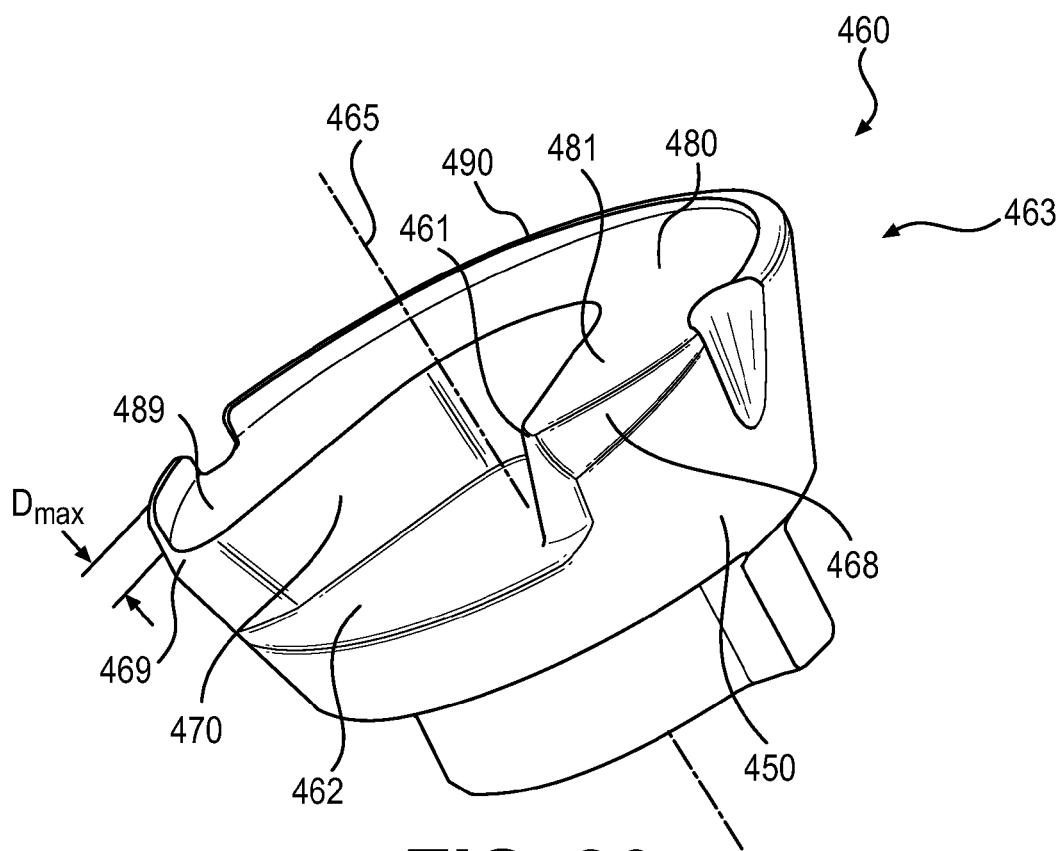
FIG. 20 is a perspective view of the lock shown in FIG. 19.

In some exemplary embodiments, a base of a skirt in a lock may be shaved or form a recessed portion to provide a space for work material between the base and a support structure (e.g., lateral side 22 of adapter 20 shown in FIG. 2). Although a small gap of about 0.1 mm is generally provided between the base and the support structure, work material that may enter into the gap may fill up the gap and become hardened over time. The packed or hardened work material in the gap may increase friction between the base and the support structure, which may increase torque necessary to rotate the lock. To reduce the friction caused by the packed work material, as shown in FIGS. 19 and 20, lock 460 may include a sloped surface 480 at base 468 of skirt 463, such as a helical surface 480.

For example, C-shaped skirt 463 of lock 460 may include a first circumferential end 461 and a second circumferential end 469 defining a lock slot 462 therebetween. Skirt 463 further includes an outer surface 450 configured to be rotatably received in an inner surface of a retainer bushing (e.g., inner surface 74 of retainer bushing 70 of FIGS. 6 and 7) and an inner surface 470 configured to contact a portion of a support member (e.g., post 23 of FIG. 2) in lock slot 462. Skirt 463 also includes base 468 extending between outer surface 450 and inner surface 470, where base 468 includes sloped surface 480. Sloped surface 480 may occupy substantially all or only a portion of base 468. Sloped surface 480 may extend in a direction non-parallel to a plane perpendicular to lock rotation axis 465. Sloped surface 480 may be defined by an outer edge 490, and at least a portion of the outer edge 490 (e.g., a portion that connects between outer surface 450 and base 468) may extend in a plane substantially perpendicular to lock rotation axis 465.

In some exemplary embodiments, sloped surface 480 may form helical surface 480 with a depth increasing from a first end 481 to a second end 489 when measured from the plane of outer edge 490. First end 481 may be adjacent first circumferential end 461, and second end 489 may be adjacent second circumferential end 469. By way of example only, helical surface 480 may have a helix angle of approximately 2.5 degrees with the pitch of the helix of approximately 6 mm, and the maximum depth $D_{max}$ adjacent second end 489 of helical surface 480, as shown in FIG. 20, may be approximately 4.0 mm. With sloped or helical surface 480 providing a reduced base profile relative to a support structure that comes into contact with base 468, friction between base 468 of lock 460 and a surface of the support structure can be substantially reduced.

According to another exemplary embodiment, FIGS. 21-24 schematically illustrate a retainer system 500 employing an eccentric lock assembly for creating one or more gaps between various components of retainer system 500. As will be detailed herein, retainer system 500 shown in FIGS. 21-24 encompasses, among other features, the following two features: (1) a lock 560 having an eccentric outer surface 566 to create a gap between an outer surface 566 and a portion of a lock cavity 540 and/or a retainer bushing 570; and (2) a lock 560 having a rotational axis 575 not coinciding with a center 525 of a post 523 to create a gap between an inner surface 568 of lock 560 and post 523. While these two features are disclosed together in the embodiment shown in FIGS. 21-24, it should be understood that a retainer system consistent with the present disclosure may separately include only one of these features, as further illustrated in FIGS. 25-28.

Figure 21:
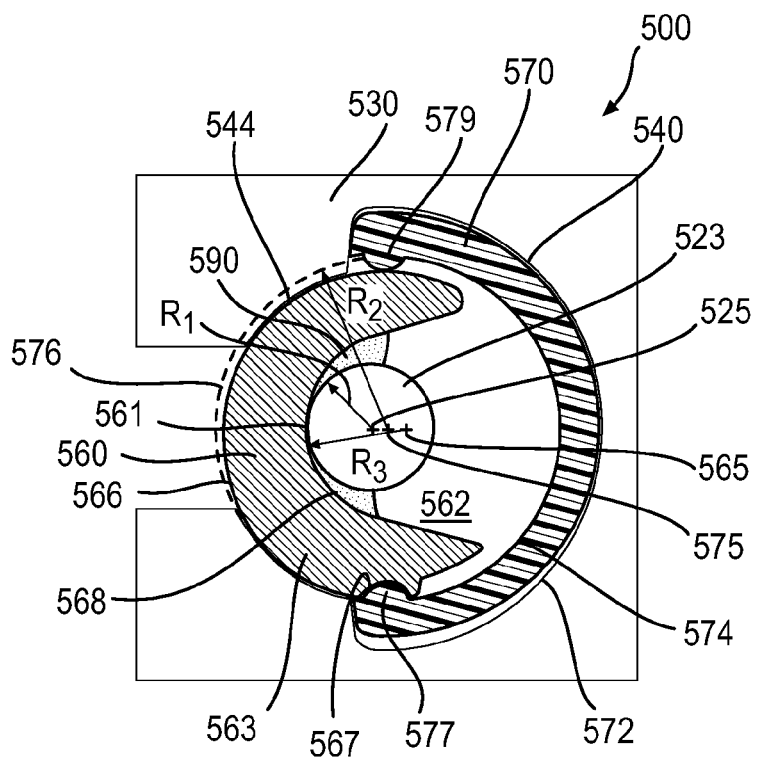
FIGS. 21-24 are schematic illustrations of various positions of a lock relative to a retainer bushing in a lock cavity according to another exemplary embodiment of the present disclosure.

FIG. 21 illustrates retainer system 500 in a locked position with post 523 of a support structure received in a lock slot 562 defined by a C-shaped skirt 563 of lock 560. Post 523 has a radius $R_1$ from its center 525. Skirt 563 is rotatably received in a retainer bushing 570. Retainer bushing 570 may be seated in lock cavity 540 of a ground engaging tool 530 with an outer surface 572 of retainer bushing 570 mating with an inner surface of lock cavity 540. Retainer bushing 570 may include an inner surface 574 extended about lock rotation axis 575 with a radius $R_2$. The circumference 576 defined by radius $R_2$ about lock rotation axis 575 is indicated with a dotted line in FIG. 21. By way of example only, in some exemplary embodiments, radius $R_2$ may range from approximately 37 mm to approximately 42 mm.

Outer surface 566 of skirt 563 may extend about lock rotation axis 575 and may be configured to be rotatably received in inner surface 574 of retainer bushing 570. As shown in FIG. 21, lock rotation axis 575 coincides with the retainer axis of retainer bushing 570 when retainer bushing 570 is seated within lock cavity 540 with outer surface 566 of skirt 563 rotatably received in inner surface 574 of retainer bushing 570.

Outer surface 566 may have, at least in part, a varying radius with respect to lock rotation axis 575. For example, as shown in FIG. 21, outer surface 566 may have a gradually decreasing radius in a clockwise direction (e.g., in a direction opposite the rotational direction of lock 560), forming an eccentric surface with respect to lock rotation axis 575. In one exemplary embodiment, the varying radius may extend from one circumferential end of skirt 563 to another circumferential end. In an alternative embodiment, the varying radius may extend from any location between two circumferential ends of skirt 563 to one of the circumferential ends of skirt 563. This eccentric configuration of outer surface 566 may create a gap between outer surface 566 and a portion of lock cavity 540 (e.g., a portion that abuts outer surface 566 in the locked position) and/or retainer bushing 570 when lock 560 is rotated from the locked position, shown in FIG. 21, to an unlocked position. Creating such a gap may reduce friction caused by work material packed between outer surface 566 and a portion of lock cavity 540 and/or retainer bushing 570, thereby facilitating the rotation of lock 560 during an unlocking operation of retainer system 500. By way of example only, the radius of outer surface 566 may vary within a range between approximately 40 mm and approximately 45 mm.

In one exemplary embodiment, as shown in FIG. 21, a portion of lock cavity 540 may have a surface 544 protruding inside circumference 576 defined by radius $R_2$, such that surface 544 may contact at least a portion of eccentric outer surface 566 of skirt 563 in at least the locked position. In some exemplary embodiments, surface 544 may have a shape conforming to the profile of outer surface 566.

As shown in FIG. 21, lock rotation axis 575 of lock 560 may not coincide with center 525 of post 523. Further, inner surface 568 of skirt 563 may be configured such that, as skirt 563 is rotated from the locked position of FIG. 21 to the unlocked position of FIG. 24, substantially the same distance $R_3$ is maintained between an inner surface axis 565 and a portion of inner surface 568 (e.g., a closed end 561 of skirt 563) that contacts post 523 in the locked position shown in FIG. 21. This eccentric arrangement between lock 560 and post 523 may create a gap between inner surface 568 of skirt 563 and post 523 as skirt 563 is rotated from the locked position of FIG. 21 to an unlocked position of FIG. 24, thereby reducing friction caused by work material packed between lock 560 and post 523 during the unlocking operation of retainer system 500.

In the disclosed embodiment of FIGS. 21-24, retainer bushing 570 may include a first detent projection 577 and a second detent projection 579, each located near each of the corresponding circumferential ends of retainer bushing 570 and spaced from one another by approximately 180 degrees. Skirt 563 may have only one detent recess 567 configured to mate with either one of first and second detent projections 577 and 579. In the locked position shown in FIG. 21, detent recess 567 of skirt 563 may engage first detent projection 577 to rotationally hold skirt 563 in the locked position, and closed end 561 of skirt 563 mates with an outer surface of post 523 to securely retain post 523 in lock slot 562. Due to the difference between radius $R_2$ of inner surface 574 of retainer bushing 570 and the varying radius of eccentric outer surface 566 of skirt 563, outer surface 566 of skirt 563 may engage second detent projection 579. For example, even though skirt 563 does not include a second detent recess corresponding to second detent projection 579, radius $R_2$ of inner surface 574 of retainer bushing 570 and the varying radius of outer surface 566 can be arranged such that outer surface 566 of skirt 563 can provide sufficient structural support relative to retainer bushing 570 with only one detent recess 567.

Figure 22:
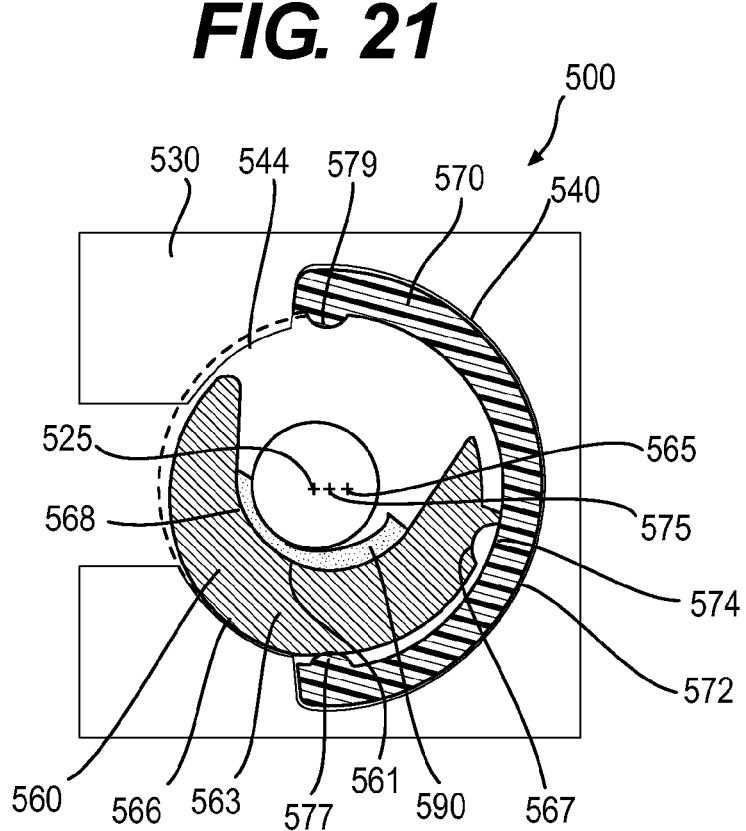
Figure 23:
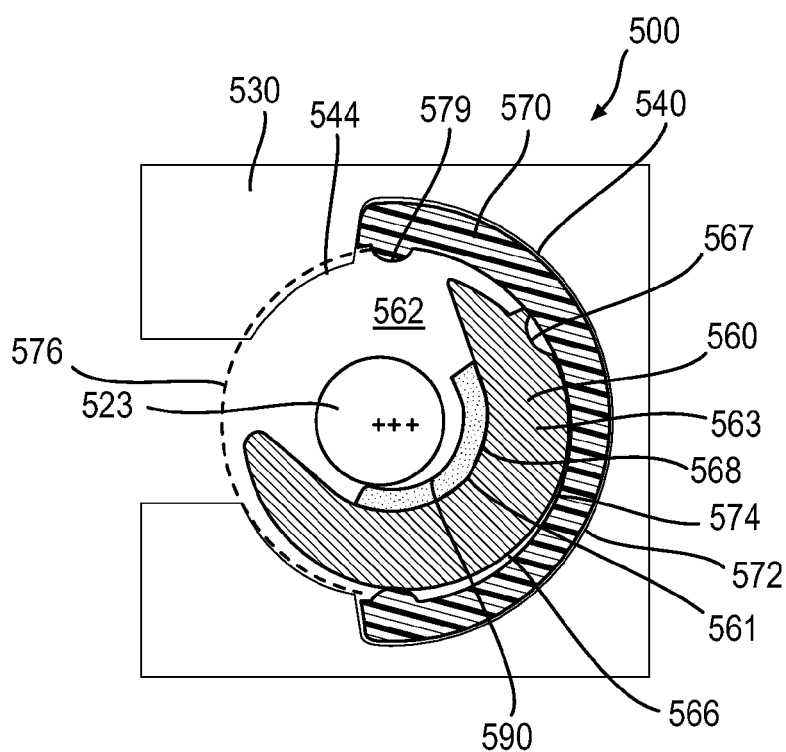
Figure 24:
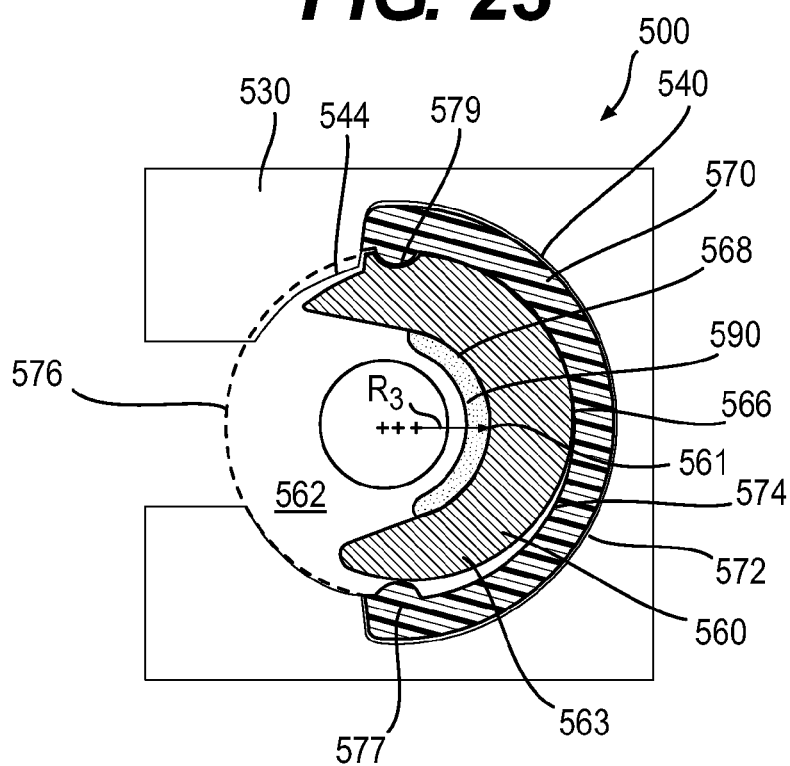

To move retainer system 500 from the locked position of FIG. 21 to an unlocked position of FIG. 24, lock 560 may be rotated counter-clockwise about lock rotation axis 575. As described above, lock 560 may include a tool interface (not shown) in a head portion to rotate lock 560 and skirt 563. FIGS. 22 and 23 illustrate intermediate positions between the locked position of FIG. 21 and the unlocked position of FIG. 24. As skirt 563 is rotated counter-clockwise from the locked position of FIG. 21, closed end 561 or any other portion of inner surface 568 of skirt 563 moves away from the outer surface of post 523, creating a gap in lock slot 562 between inner surface 568 of skirt 563 and post 523, as shown in FIG. 22. As a result, work material 590 packed between inner surface 568 of skirt 563 and post 523 in the locked position may be loosened, displaced, and/or dispersed away from skirt 563, making it easier for an operator to rotate lock 560. Further rotation of skirt 563, as shown in FIG. 23, may create an additional gap between skirt 563 and post 523 and, as is apparent from FIG. 23, packed work material 590 may no longer interfere significantly with the rotation of skirt 563.

In the unlocked position shown in FIG. 24, detent recess 567 of skirt 563 may engage second detent projection 579 of retainer bushing 570 to rotationally fix skirt 563 in the unlocked position. Similar to the locked position of FIG. 21, outer surface 566 of skirt 563 may engage first detent projection 577 while detent recess 567 of skirt 563 engages second detent projection 579. As mentioned above, the engagement between detent recess 567 and second detent projection 579 and the contact between outer surface 566 of skirt 563 and first detent projection 577 may provide sufficient structural support of skirt 563 relative to retainer bushing 570 in the unlocked position.

As mentioned above, retainer system 500 of FIGS. 21-24 encompasses, among other things, two features that can be separately employed in a retainer system. Accordingly, FIGS. 25 and 26 and FIGS. 27 and 28 schematically illustrate two exemplary embodiments that separately employ these two features, respectively. In the following description of these exemplary embodiments, only the features that are different from the embodiment shown in FIGS. 21-24 are highlighted, and the detailed description of the features that are common to the above-described embodiments are omitted herein.

Figure 25:
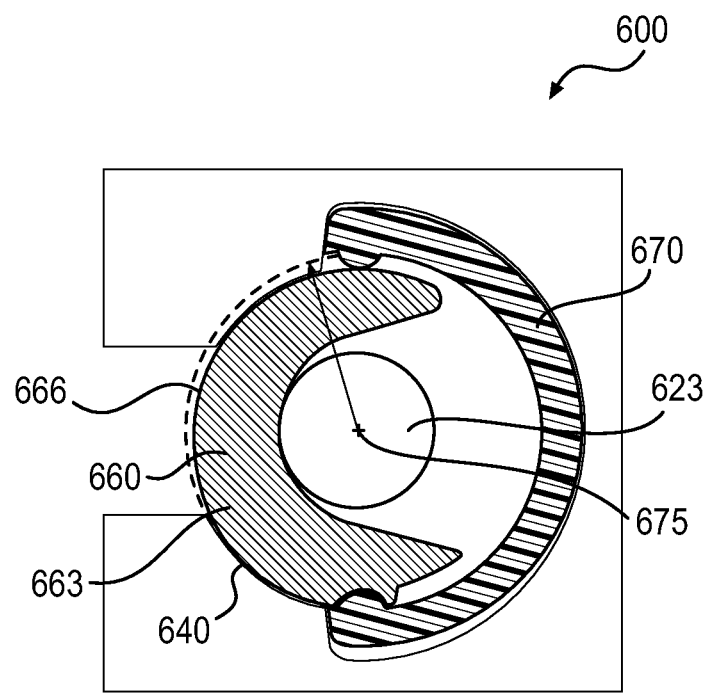
FIGS. 25 and 26 are schematic illustrations of a locked position (FIG. 25) and an unlocked position (FIG. 26) of a lock relative to a retainer bushing in a lock cavity according to another exemplary embodiment of the present disclosure.
Figure 26:
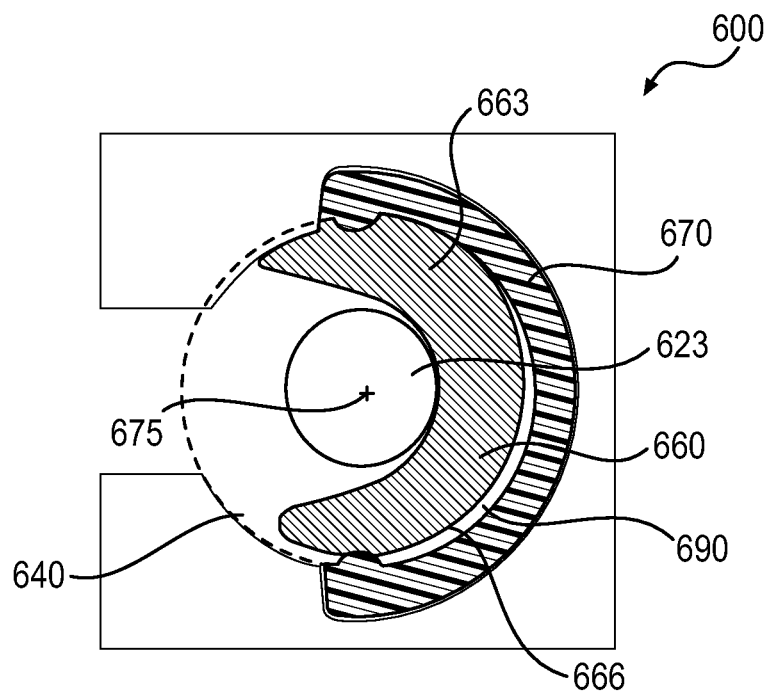

FIGS. 25 and 26 schematically illustrate a retainer system 600 that employs a lock 660 having an eccentric outer surface 666 that may create a gap 690 between outer surface 666 and a portion of a lock cavity 640 and/or a retainer bushing 670. Lock 660 (and its skirt 663), retainer bushing 670, and lock cavity 640 of this embodiment may be substantially similar to those described above with reference to FIGS. 21-24 and, therefore, detailed description thereof is omitted herein. Retainer system 600 of FIGS. 25 and 26 may differ from the embodiment of FIGS. 21-24 in that a lock rotation axis 675 of lock 660 (and a retainer axis of retainer bushing 670) may coincide with a center of post 623. In other words, this embodiment does not require that lock 660 and post 623 have an eccentric arrangement with respect to each other.

With eccentric outer surface 666 with a varying radius about lock rotation axis 675, lock 660 may create gap 690 between outer surface 666 and a portion of lock cavity 640 and/or retainer bushing 670 when lock 660 is rotated from the locked position, shown in FIG. 25, to an unlocked position, shown in FIG. 26. Creating gap 690 may reduce friction caused by work material packed between outer surface 666 of skirt 663 and a portion of lock cavity 640 and/or retainer bushing 670, thereby facilitating the rotation of lock 660 during an unlocking operation of retainer system 600.

Figure 27:
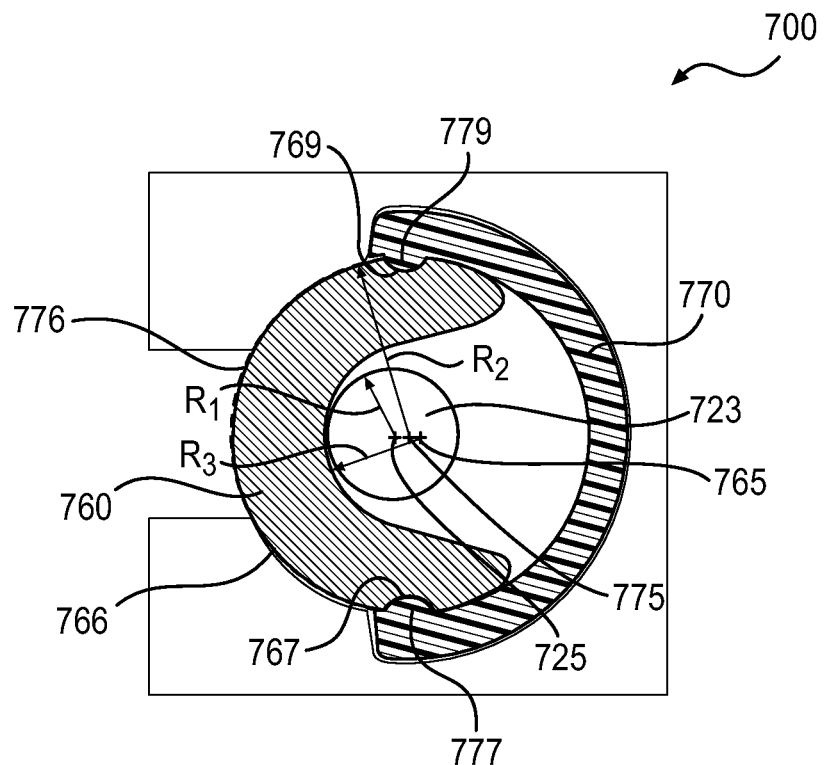
FIGS. 27 and 28 are schematic illustrations of a locked position (FIG. 27) and an unlocked position (FIG. 28) of a lock relative to a retainer bushing in a lock cavity according to still another exemplary embodiment of the present disclosure.
Figure 28:
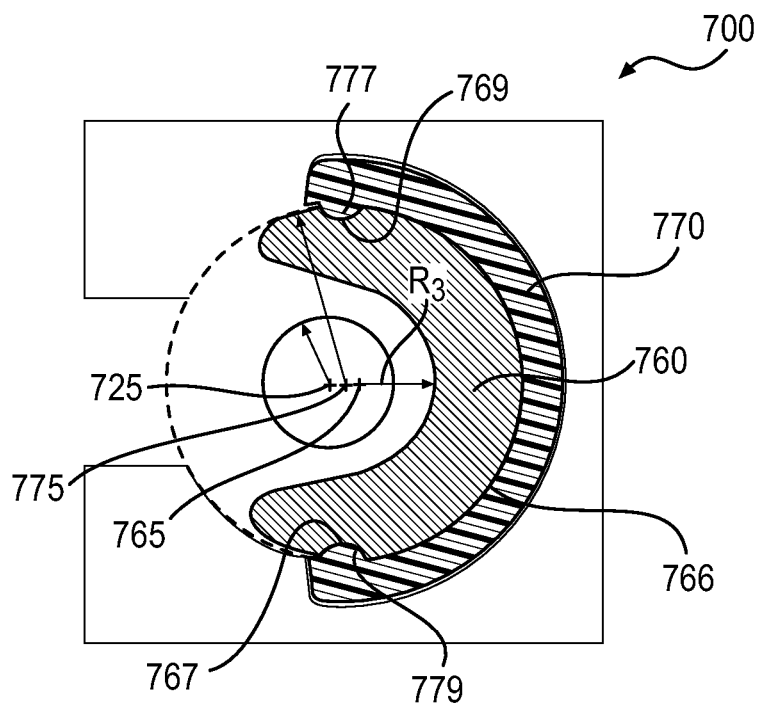

FIGS. 27 and 28 schematically illustrate a retainer system 700 that employs a lock 760 having a rotational axis 775 not coinciding with a center 725 of a post 723 to create a gap between an inner surface of lock 760 and post 723. This eccentric arrangement between and among lock 760, retainer bushing 770, and post 723 of this embodiment (e.g., with differently arranged center 725 of post 723, lock rotation axis 775, and/or inner surface axis 765) may be substantially similar to those described above with reference to FIGS. 21-24 and, therefore, detailed description thereof will be omitted herein. Retainer system 700 of FIGS. 27 and 28 may differ from the embodiment shown in FIGS. 21-24 in that lock 760 does not include an eccentric outer surface with a varying radius. Instead, an outer surface 766 of lock 760 may have a substantially uniform radius with respect to lock rotation axis 775 with outer surface 766 substantially circumscribing a circumference 776 defined by radius $R_2$ about lock rotation axis 775, as shown in FIGS. 27 and 28. Further, unlike lock 560 of FIGS. 21-24 having a single detent recess for mating with either one of first and second detent projections 777 and 779, lock 760 may include a first detent recess 767 and a second detent recess 769 configured to mate with first detent projection 777 and second detent projection 779, respectively, in the locked position of FIG. 27 and with second detent projection 770 and first detent projection 777, respective, in the unlocked position of FIG. 28. It should be understood that lock 760 of this embodiment may be any one of the locks shown in and described with reference to FIGS. 4, 5, 10, and 12-20.

The eccentric arrangement between lock 760 and post 723 may create a gap between the inner surface of lock 760 and post 723 as lock 760 is rotated from the locked position of FIG. 27 to an unlocked position of FIG. 28, thereby reducing friction caused by work material packed between lock 760 and post 723 during the unlocking operation of retainer system 700 and facilitating the rotation of lock 760 during an unlocking operation of retainer system 700.

INDUSTRIAL APPLICABILITY

The disclosed retainer systems and ground engaging tools may be applicable to various earth-working machines, such as, for example, excavators, wheel loaders, hydraulic mining shovels, cable shovels, bucket wheels, bulldozers, and draglines. When installed, the disclosed retainer systems and ground engaging tools may protect various implements associated with the earth-working machines against wear in the areas where the most damaging abrasions and impacts occur and, thereby, prolong the useful life of the implements.

The disclosed configurations of various retainer systems and components may provide secure and reliable attachment and detachment of ground engaging tools to various earth-working implements. In particular, certain configurations of the disclosed retainer systems may address certain issues associated with work material getting into the space around the retainer system and increasing friction between components of the retainer system and/or between retainer system and a ground engaging tool. Moreover, certain configurations of the disclosed retainer systems may reduce friction between components of a retainer system and/or between a component of a retainer system and a ground engaging tool.

The disclosed retainer system 50 includes lock 60 and retainer bushing 70. Retainer bushing 70 is configured to mate with inner surface 43 of lock cavity 40 of tip 30, and lock 60 is configured to mate with inner surface 74 of retainer bushing 70. To attach tip 30 to adapter 20, lock 60 and retainer bushing 70 are assembled into lock cavity 40 of tip 30. Lock cavity 40 opens into side slot 41 that extends rearward, which allows passage of post 23 of adapter 20. Once post 23 is inserted inside lock slot 62, lock 60 is rotated about lock rotation axis 65 to a closed position. In this position, the portion of lock skirt 63 adjacent closed end 68 may preclude sliding frusto-conical portion of post 23 into or out of lock slot 62, preventing sliding movement of tip 30 relative to adapter 20. In the locked position, detent recesses 67 of lock 60 may engage detent projections 77 of retainer bushing 70, which may releasably hold lock 60 in the locked position.

To detach tip 30 from adapter 20, lock 60 is rotated from the locked position to an unlocked position to cause detent projections 77 and detent recesses 67 to disengage from one another. Once detent projections 77 and detent recesses 67 are disengaged from one another, outer surface 66 of skirt 63 of lock 60 may slide along inner surface 74 of retainer bushing 70, as lock 60 rotates around lock rotation axis 65. Once lock 60 rotates approximately 180 degrees around lock rotation axis 65, detent projections 77 and detent recesses 67 may reengage one another to releasably hold lock 60 in that rotational position.

It will be apparent to those skilled in the art that various modifications and variations can be made to the disclosed retainer systems and/or ground engaging tool systems. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A retainer bushing for use with a lock of a ground engaging tool, comprising:
a skirt extending around a retainer axis, the skirt including:
an outer surface configured to mate with a lock cavity of the ground engaging tool; and
an inner surface configured to rotatably receive an outer surface of the lock; and
a detent projection extending radially inward from the inner surface with respect to the retainer axis and configured to engage a detent recess of the lock to resist rotation of the lock,
wherein the skirt and the detent projection are integrally constructed of a thermoplastic material comprising polyoxymethylene;
wherein the detent projection comprises a convex surface with a substantially constant radius; and
wherein a center of the radius of the convex surface is positioned at a first distance from the retainer axis that is greater than a second distance between the retainer axis and the outer surface of the skirt.

2. The retainer bushing of claim 1, further comprising a second detent projection extending radially from the inner surface and spaced approximately 180 degrees from the detent projection about the retainer axis.

3. The retainer bushing of claim 1, wherein a portion of the outer surface that is directly opposite to a portion of the inner surface from which the detent projection extends comprises a smooth surface without a depression.

4. The retainer bushing of claim 1, wherein the radius of the convex surface ranges from approximately 9.5 mm to approximately 14.2 mm.

5. The retainer bushing of claim 1, wherein the ratio of the first distance to the second distance may be approximately 1.25.

6. The retainer bushing of claim 1, wherein the inner surface comprises a frustoconical surface.

7. A retainer bushing for use with a lock to secure a ground engaging tool to a support member, the lock including an outer surface, the ground engaging tool including a lock cavity, comprising:
a C-shaped body constructed of polyoxymethylene, the body including:
an outer surface configured to mate with the lock cavity of the ground engaging tool;
an inner surface configured to rotatably receive the outer surface of the lock; and
a detent formed on the inner surface and configured to engage a detent of the lock to resist rotation of the lock,
wherein a portion of the outer surface of the body directly opposite to a portion of the inner surface of the body on which the detent is formed comprises a frustoconical surface.

8. The retainer bushing of claim 7, wherein the detent comprises two detents extending radially from the inner surface about the retainer axis and spaced approximately 180 degrees from one another.

9. The retainer bushing of claim 7, wherein the detent comprises a convex surface with a substantially constant radius.

10. The retainer bushing of claim 9, wherein a center of the radius of the convex surface is positioned at a first distance from the retainer axis that is greater than a second distance between the retainer axis and the outer surface of the body.

11. The retainer bushing of claim 10, wherein the radius of the convex surface ranges from approximately 9.5 mm to approximately 14.2 mm.

12. A retainer system for a ground engaging tool, comprising:
a lock including:
a head including a tool interface;
a skirt extending from the head and including an outer surface; and
a first detent formed on the outer surface of the skirt; and
a retainer bushing including a C-shaped body constructed of polyoxymethylene, the retainer bushing including:
an outer surface configured to mate with a lock cavity of the ground engaging tool;
an inner surface configured to rotatably receive the outer surface of the lock; and
a second detent formed on the inner surface of the retainer bushing and configured to engage the first detent of the lock,
wherein a portion of the outer surface of the body directly opposite to a portion of the inner surface of the body on which the second detent is formed comprises a frustoconical surface.

13. The retainer system of claim 12, wherein the second detent comprises two second detents extending radially from the inner surface about the retainer axis and spaced approximately 180 degrees from one another.

14. The retainer system of claim 12, wherein the second detent comprises a convex surface with a substantially constant radius.

15. The retainer system of claim 14, wherein a center of the radius of the convex surface is positioned at a first distance from the retainer axis that is greater than a second distance between the retainer axis and the outer surface of the retainer bushing.

* * * * *